(12) United States Patent
Chauvin et al.

(10) Patent No.: US 9,764,509 B2
(45) Date of Patent: Sep. 19, 2017

(54) METHOD AND APPARATUS FOR FABRICATING CONTAINERS

(71) Applicant: Discma AG, Hünenberg (CH)

(72) Inventors: Guillaume Chauvin, Monthureux sur Saône (FR); Damien Kannen-Giesser, Golbey (FR)

(73) Assignee: Discma AG, Hunenberg (CH)

( * ) Notice: Subject to any disclaimer, the term of this patent is extended or adjusted under 35 U.S.C. 154(b) by 289 days.

(21) Appl. No.: 14/419,311

(22) PCT Filed: Jul. 30, 2013

(86) PCT No.: PCT/EP2013/066036
§ 371 (c)(1),
(2) Date: Feb. 3, 2015

(87) PCT Pub. No.: WO2014/020042
PCT Pub. Date: Feb. 6, 2014

(65) Prior Publication Data
US 2015/0183150 A1    Jul. 2, 2015

(30) Foreign Application Priority Data

Aug. 3, 2012  (EP) .................................... 12179129

(51) Int. Cl.
*B29C 49/46*  (2006.01)
*B29C 49/78*  (2006.01)
(Continued)

(52) U.S. Cl.
CPC .............. *B29C 49/46* (2013.01); *B29C 49/48* (2013.01); *B29C 49/783* (2013.01); *B29C 49/12* (2013.01);
(Continued)

(58) Field of Classification Search
CPC ....... B29C 49/46; B29C 49/12; B29C 49/783; B29C 2049/165; B29C 2049/4655;
(Continued)

(56) References Cited

U.S. PATENT DOCUMENTS

2011/0135778 A1    6/2011  Andison et al.

FOREIGN PATENT DOCUMENTS

| DE | 10 2004 014 653 A1 | 10/2005 |
| DE | 10 2011 009 889 A1 | 8/2012 |
| FR | 2 917 004 A1 | 12/2008 |

OTHER PUBLICATIONS

European Patent Office, Rijswijk, Netherlands, International Search Report of International Application No. PCT/EP2013/066036, Mailed on Oct. 16, 2013, 2 pages.

*Primary Examiner* — Michael C Miggins
(74) *Attorney, Agent, or Firm* — Eric J. Sosenko; Jonathan P. O'Brien; Honigman Miller Schwartz and Cohn LLP

(57) ABSTRACT

A method for the fabrication of a container from a substantially tubular preform provided with an open end communicating with a cavity comprises the steps of positioning the preform within a mold that substantially defines a container such that the open end of the preform protrudes from the mold; providing an injector in sealed fluid communication with the open end of the preform which injects a quantity of liquid into the cavity of the preform, increasing the pressure within the cavity and inducing the preform to deform into the shape of the mold and form a container; and then reducing the pressure within the container to atmospheric pressure while maintaining sealed fluid communication between the injector and the open end. Using the method for fabricating and filling a beverage container.

12 Claims, 6 Drawing Sheets

(51) Int. Cl.
  *B29C 49/48* (2006.01)
  *B29C 49/12* (2006.01)
  *B29C 49/16* (2006.01)
  *B29C 49/58* (2006.01)
  *B29L 31/00* (2006.01)

(52) U.S. Cl.
  CPC .. *B29C 2049/165* (2013.01); *B29C 2049/465* (2013.01); *B29C 2049/4655* (2013.01); *B29C 2049/4664* (2013.01); *B29C 2049/5806* (2013.01); *B29L 2031/7158* (2013.01); *Y10T 428/1397* (2015.01)

(58) Field of Classification Search
  CPC .... B29C 2049/4664; B29C 2049/5806; B29C 49/48; B29C 2049/465; B29L 2031/7158; Y10T 428/1397
  See application file for complete search history.

DETAIL A

METHOD AND APPARATUS FOR FABRICATING CONTAINERS

FIELD OF THE INVENTION

This invention relates generally to a method for the fabrication of containers. This invention also relates to an apparatus for performing such a method, as well as the containers so produced.

BACKGROUND

In the manufacture of containers, it is known to employ methods of fabrication such as blow molding, or variants such as stretch blow molding.

In the blow molding method, a preform is first fabricated by conventional molding methods. The preform is generally of a substantially tubular shape, being closed at one end so as to define a cavity. The preform may also be provided at an open end with a closure means for engaging a closure device, such as a flange or threading.

The preform is first placed within a mold configured to define a container, generally with the open end and closure means protruding from the mold. A nozzle is positioned upon about the open end of the preform and injects a quantity of fluid into the cavity of the preform. This injection of fluid induces the preform to deform and expand into the shape defined by the mold. As the preform comes into contact with and assumes the shape of the mold, the pressure of the fluid will increase.

When the preform has completely deformed into the shape of the mold, any accumulated pressure within is released by venting the container to the ambient atmosphere. This may be accomplished by opening a channel between the container and atmosphere, or more commonly by simply detaching the container from the molding apparatus. The container is then removed from the mold, filled, and sealed.

In one variation of the method, a liquid such as water is used as the working fluid. This liquid may be sealed into the container and distributed for consumption. In the fabrication of beverage containers, the manufacture and filling of the container may be combined into a single step and realize advantages in efficiency and speed of production.

This is disadvantageous, however, in that upon completion of the injecting of the liquid, the pressure inside the container may be very high. When the container is vented to atmosphere upon completion of the molding process, this overpressure will cause the liquid to overflow and spill from the container.

Furthermore, when the liquid is to be sealed into the container and distributed as a product, this overflowing results in significant waste and uncertainty as to the exact volume of product in each container.

It is therefore an object of this invention to provide a method for fabricating a container with a reduction in waste of the liquid injected during the fabrication process.

According therefore to a first aspect, the invention is directed to a method for the fabrication of a container, comprising the steps of providing a preform said preform being substantially tubular and being provided with an open end communicating with a cavity; positioning said preform within a mold such that said open end of said preform protrudes from said mold, the shape of said mold substantially defining a container; providing an injection means, said injection means being disposed in sealed fluid communication with said open end of said preform and being further configured to inject a quantity of liquid into said cavity of said preform; injecting said quantity of liquid into said cavity of said preform, thereby increasing the pressure within said cavity and inducing said preform to deform into the shape of said mold and form a container; and reducing the pressure within said container to atmospheric pressure while maintaining sealed fluid communication between said injection means and said open end.

This is advantageous in it permits the fabrication of containers at high pressures without having to subsequently vent the containers directly to atmosphere. Instead, the maintaining of sealed communication with the open end of the container permits one to reduce the pressure within the container to atmospheric pressure in a controlled manner, thereby reducing or eliminating the foaming, spraying and overflowing that results when the container is merely vented directly to atmosphere. This reduces waste of the liquid and lowers the cost of production of the containers.

The invention is further advantageous in that, since spraying and overflowing during the filling process is reduced or eliminated, the process is much cleaner than those known in the art. This results in reduced costs of operation for the machinery embodying the invention, as less liquid will be sprayed onto the machinery and surrounding surfaces. The hygienic conditions of the forming and filling operation are also improved, especially where the liquid contains sugars or fats as in e.g. milk products.

The invention is further advantageous in that, since spraying and overflowing is reduced or eliminated, the volume of fluid within the container after fabrication is completed can be much more accurately known. In particular, since spraying and overflowing are eliminated, the exact quantity of liquid within the container at the end of the sealing step can be reliably determined from the quantity of liquid injected during the forming of the container, measured by e.g. a flow meter. This is especially advantageous where the liquid injected during the fabrication of the container is to be sealed into and distributed in said container. One may produce a container with a known, predefined quantity of liquid, without having to employ means for compensating for spraying or overflowing to ensure that the container is filled with the desired volume of liquid. This reduces the complexity of the filling process and the associated cost of carrying it out.

According to a feature, after the step for positioning the preform the method includes a step for stretching the preform along a longitudinal axis.

This is advantageous in that stretching the preform will facilitate its deformation along the longitudinal axis, permitting a greater variety of containers to be fabricated.

According to another feature, the pressure generated within said cavity at the completion of the injecting step is between 15 and 50 bars.

This is advantageous in that the fabrication of containers may be most effectively carried out when the liquid is injected into the preform at a pressure within this range.

Preferably, the pressure generated within said cavity at the completion of the injecting step is between 15 and 30 bars.

Forming a container by the injection of a liquid within this pressure range is most efficient and yields optimal rates of production of containers.

According to another feature, during the reducing step the pressure within said container is monitored by a pressure sensor.

This is advantageous in that the employment of a pressure sensor permits one to monitor the pressure within the container during the reducing step. One may thereby reduce the pressure within the container to exactly atmospheric, avoiding any overshoot which would create a vacuum and suck liquid from the container. The process may be carried out without any additional step or equipment for compensating for any liquid removed from the container during the reducing step, improving the efficiency and output of the process.

According to still another feature, during the reducing step the pressure within the container is reduced to atmospheric pressure in between 0.1 and 2 seconds.

This is advantageous in that it permits the fabrication of containers at a high rate.

According to still another feature, after the reducing step it comprises a closing step for closing the container with the liquid therein.

This is advantageous in that since the forming process may be configured to deposit a pre-determined, known volume of liquid into the container, closing the containers after forming them permits one to produce sealed containers with a consistent volume of liquid rapidly and at minimal expense.

According to a second aspect, the invention is directed to a container fabricated by the method described above.

This is advantageous in that a container so produced will embody the advantages of the method of the invention and be therefore easier and less expensive to produce than the containers known to the art.

According to a third aspect, the invention is directed to an apparatus for the fabrication of a container, comprising a mold, the shape of said mold substantially defining a container and further configured to accept a substantially tubular preform being provided with an open end communicating with a cavity, said open end of said preform protruding from said mold; and an injection means, said injection means being disposed in sealed fluid communication with said open end of said preform, where said injection means is configured to inject a quantity of liquid into said cavity of said preform, thereby increasing the pressure within said cavity and inducing said preform to deform into the shape of said mold and form a container, and further configured to subsequently reduce the pressure within said container to atmospheric pressure while maintaining sealed fluid communication between said injection means and said open end.

This is advantageous in that it embodies the process described above and allows one to realize its advantages in the production of containers.

According to a feature, the apparatus comprises a stretching means, said stretching means being configured to stretch the preform along a longitudinal axis.

This is advantageous in that a stretching means will facilitate the deformation of the preform along the longitudinal axis, increasing the range of container shapes and sizes which may be formed by the apparatus. The advantages of the invention may thereby be realized in a greater number of applications.

According to another feature, the injection means comprises a piston disposed within a cylinder, said cylinder being in fluid communication with said cavity of said preform.

This is advantageous in that a piston and cylinder is a relatively simple apparatus which is capable of generating high pressures in a controlled manner. Notably, such an injection means may increase or decrease the pressure within the cavity of the preform by merely advancing or retracting the piston within the cylinder, simplifying the control means necessary to operate the apparatus. Also, piston-cylinder arrangements can be constructed robustly and with a minimum of moving parts, improving the reliability of the apparatus.

According to another feature, the injection means further comprises a nozzle provided with a valve, said valve being configured so as to selectively block or permit fluid communication with said cavity of said preform.

This is advantageous in that the inclusion of such a valve permits one to close off the nozzle while sealed fluid communication is being established between the injection means and the open end of the preform. Preforms may thus be introduced into the apparatus and formed containers removed with a minimum of leakage of liquid from the nozzle, thereby rendering the operation of the apparatus cleaner and less wasteful of liquid.

Other particularities and advantages of the invention will also emerge from the following description.

In the accompanying drawings, given by way of non-limiting examples:

Figure 1:
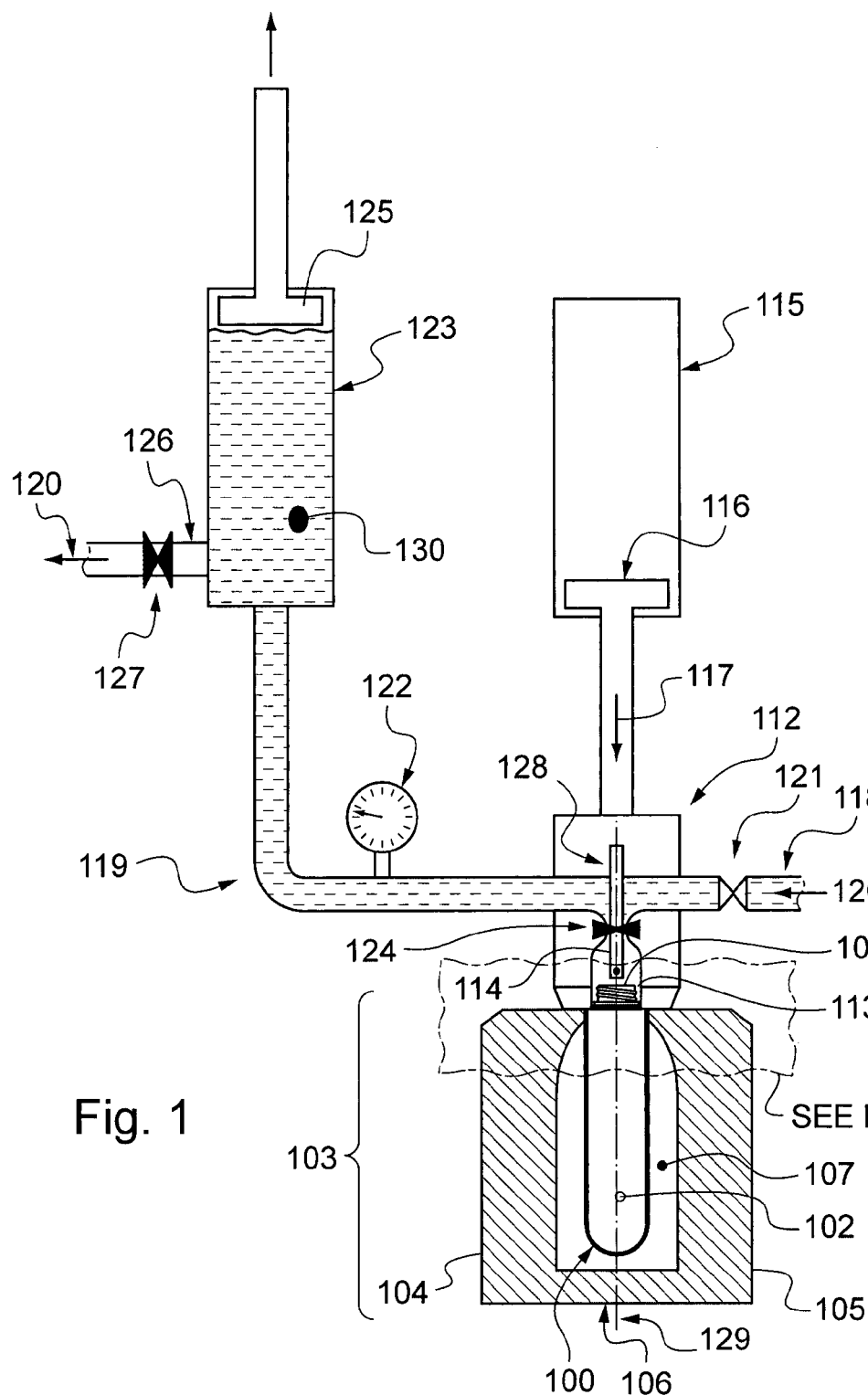
FIG. 1 depicts an apparatus according to an embodiment of the invention during a first step for positioning.

FIG. 1 depicts an apparatus embodying the invention, which is configured to blow-mold a container from a preform 100. The preform 100 is substantially tubular, being preferably in the form of a test tube or similar shape. The preform 100 is further provided with an open end 101 communicating with a preform cavity 102 within said preform 100.

The preform 100 is first positioned within a mold assembly 103, which is comprised of mold halves 104 and 105, and the mold base 106, and which is configured to accept said preform 100. When brought together, the mold halves 104 and 105 and mold base 106 define a mold cavity 107. In a preferred embodiment, the mold cavity 107 is configured in the shape of the container which is to be produced by the apparatus.

Figure 1A:
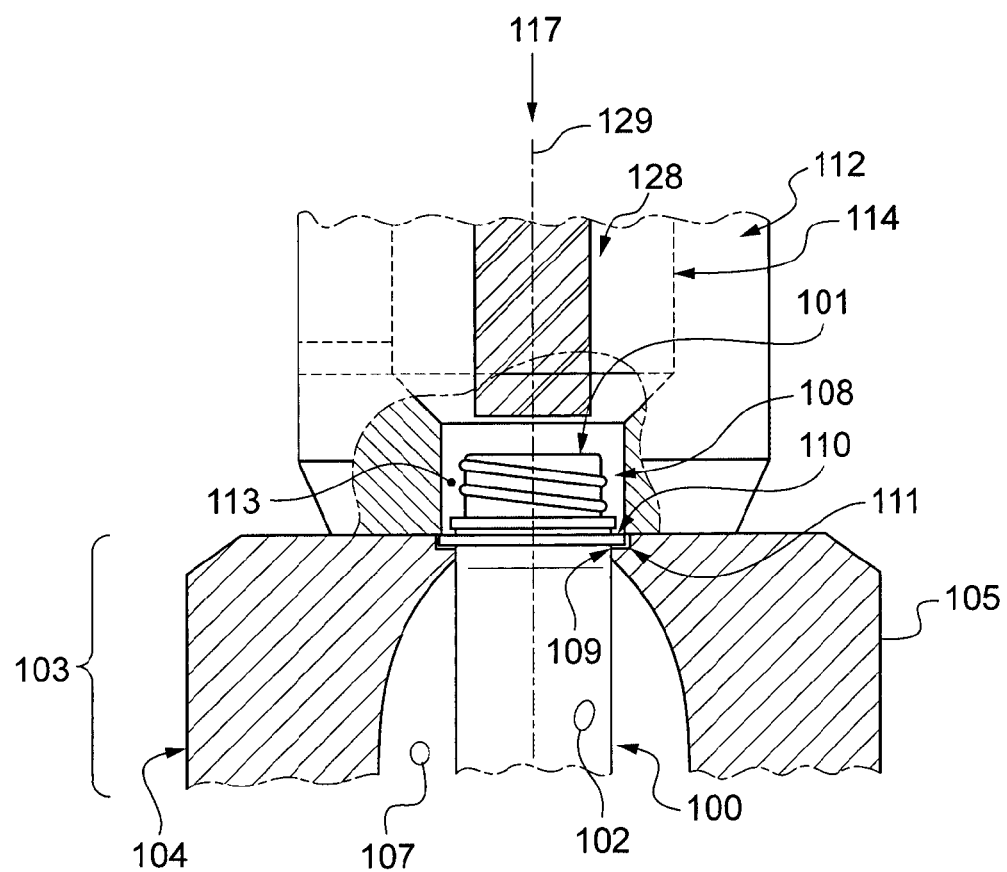
FIG. 1A depicts an enlarged Detail A depicting the engagement of the apparatus upon a preform.

The preform 100 is disposed so as to be nearly entirely within the mold cavity 107 of the mold assembly 103; only the neck 108 protrudes from the mold assembly 103 as shown in Detail A of FIG. 1A. The preform 100 protrudes through a preform hole 109 formed by the mold halves 104 and 105. The preform 100 is provided with a flange 110 which seats in a counterbore 111 disposed about the preform hole 109.

Returning now to FIG. 1, the injection means is also depicted. The injection means comprises a nozzle 112 of generally cylindrical shape, which is provided with a mouth 113 configured to fit over the neck 108 of the preform 100. Within the nozzle is a nozzle chamber 114 in communication with the mouth 113.

The nozzle 112 is pressed into the mold halves 104 and 105 by a nozzle cylinder 115 having a nozzle piston 116 to which the nozzle 112 is affixed. Preferably, the nozzle 112 is pressed into the mold halves 104 and 105 with a sealing force 117 which is sufficient to create a fluid-tight seal between the nozzle 112 and the mold halves 104 and 105; however, alternative means, such as a gasket or seal, may be employed.

As a result, the mouth 113 and nozzle chamber 114 of the nozzle 112 are placed in sealed fluid communication with the open end 101 of the preform 100 and thus with the preform cavity 102.

The nozzle 112 is further provided with a feed pipe 118 and an injection pipe 119. The feed pipe 118 and injection pipe 119 are preferably flexible so as to facilitate movement of the nozzle 112. The feed pipe 118 is connected to a liquid supply 120, from which the liquid used as the working fluid is drawn, and is controlled by a feed valve 121. In the present embodiment the working fluid in the liquid supply 120 is mineral water; however, other liquids may be employed.

The injection pipe 119 is disposed so as to establish fluid communication between the nozzle 112 and an injection cylinder 123. The injection pipe 119 is preferably provided with a pressure sensor 122, permitting the pressure within the injection pipe 119 to be determined.

The pressure sensor 122 is depicted here as an analog gauge for demonstrative purposes; however, it should be understood that other mechanical, electromechanical, or electronic means of measuring the pressure within the apparatus may be equally employed. In particular, it may be advantageous to provide the pressure sensor 122 in the form of a digital transducer, to facilitate automated control of the container fabrication process.

The nozzle 112 is also provided with a nozzle valve 124, which is configured to open and close fluid communication between the nozzle chamber 114 and mouth 113 and the feed and injection pipes 118 and 119.

The injection cylinder 123 contains an injection piston 125 which is translatably disposed within said injection cylinder 123. The injection cylinder 123 is further provided with a return pipe 126, which is in fluid communication with the liquid supply 120, and which is controlled by a return valve 127.

In a preferable embodiment, the nozzle 112 is provided with a stretching means, here represented by a stretch rod 128 in a first retracted position. The stretch rod 128 is disposed in alignment along a longitudinal axis 129 of the preform 100.

It should be understood that the depiction of the valves 121, 124, and 127, and particularly the nozzle valve 124, in these Figures is schematic in nature. The nozzle valve 124 does not therefore necessarily interfere with or otherwise interact with the nozzle valve 124 in any way. The nozzle 112, nozzle valve 124, and stretch rod 128 may therefore be configured in whichever form is most appropriate for the particular application.

At the start of the first step for positioning the injection piston 125 is retracted within the injection cylinder 123, causing a quantity of liquid 130 to be drawn from the liquid supply 120, through the feed pipe 118, nozzle 112, and injection pipe 119, and into the injection cylinder 123. The return pipe 126 is closed off by the return valve 127, preventing any flow from the return pipe 126 into the injection cylinder 123. By controlling the linear displacement of the injection piston 125, one may measure a precise quantity of liquid 130 for injecting into the preform 100 during a subsequent step for injecting. The preform 100 is then positioned within the mold assembly 103, which closes around the preform 100 and holds it in place. The nozzle valve 124 is set so as to close off flow to the nozzle chamber 114 and preventing leakage from the nozzle 112. At the same time, communication is permitted between the feed pipe 118 and the injection pipe 119 and injection cylinder 123.

The nozzle 112 is advanced downwards into contact with the mold halves 104 and 105, surrounding the neck 108 of the preform 100 with the mouth 113 of the nozzle 112 and pressing into the mold halves 104 and 105. The sealing force 117 creates a fluid-tight seal between the mold halves 104 and 105 and the nozzle 112 where they come in contact. The nozzle chamber 114 is thus placed in sealed fluid communication with the open end 101 of the preform 100.

Figure 2:
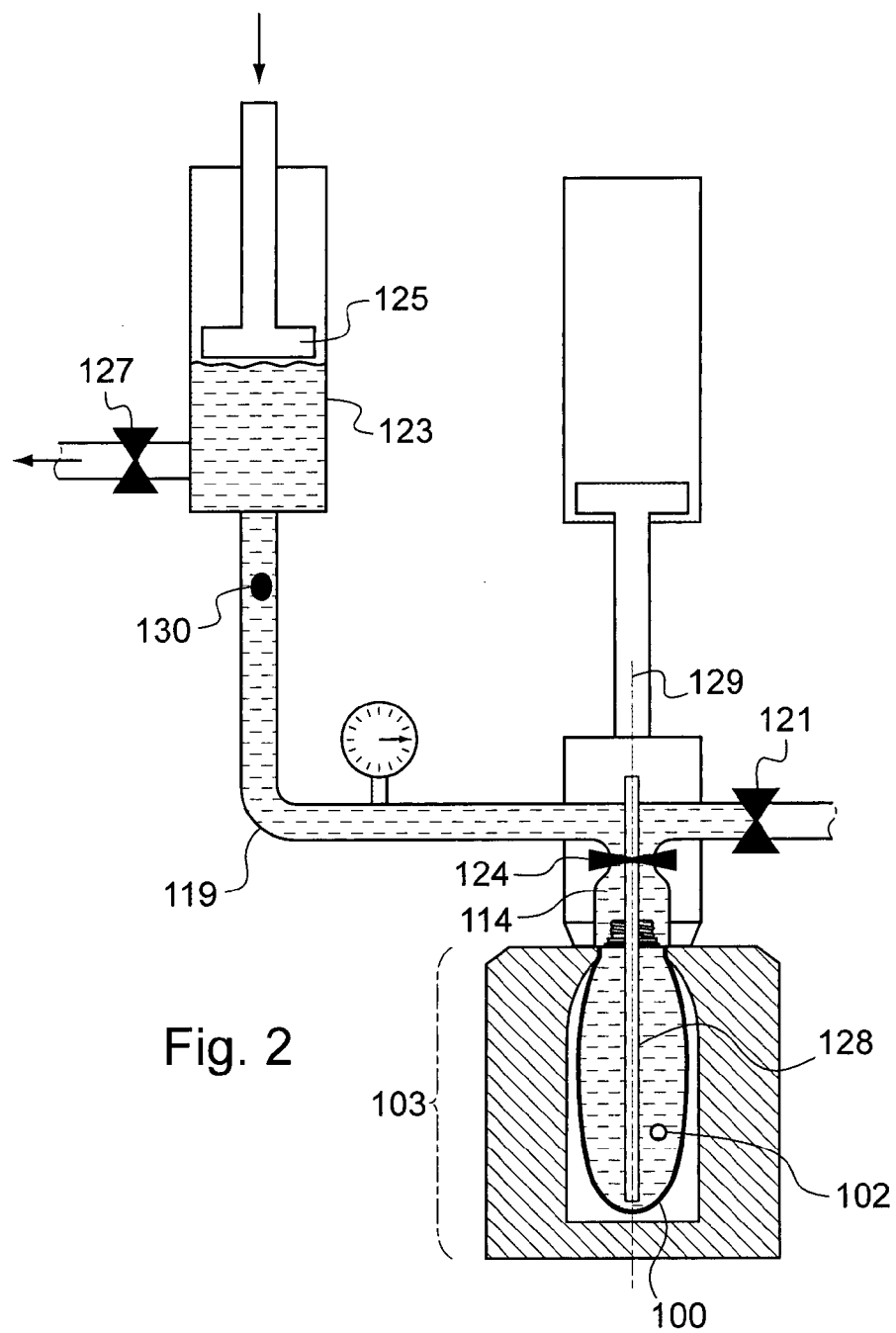
FIG. 2 depicts the apparatus during a second step for injecting.

FIG. 2 depicts the apparatus during a second step for injecting. At the start of the step for injecting, the feed valve 121 and return valve 127 are both closed The stretch rod 128 is advanced along the longitudinal axis 129, into the preform 100 through its open end 101. The stretch rod 128 will thereby force the preform 100 to deform longitudinally.

Once the stretch rod 128 has deformed the preform 100 by a predetermined amount, the nozzle valve 124 is switched so as to permit communication between the injection pipe 119 and the nozzle chamber 114. The cavity 102 of the preform 100 is thereby placed in sealed fluid communication with the injection cylinder 123 via the injection pipe 119. Once the preform 100 has undergone a sufficient amount of longitudinal deformation, the injection piston 125 is advanced in the injection cylinder 123, injecting liquid 130 into the cavity 102 of the preform 100. The preform 100 deforms as the liquid 130 is injected, expanding to fill the mold cavity 107 as depicted in FIG. 2.

As the surface of the preform 100 comes into contact with the surface of the mold 103, the pressure within the preform 100 will rise. More specifically, the pressure during the injection of the liquid 130 is between 4 and 6 bars while the preform 100 is expanding into the mold cavity 107, but increases to between 15 and 50 bars once the preform 100 is fully in contact with the surface of the mold 103. Injection pressures within this range tend to produce fully-formed containers at the highest rates of production.

Figure 3:
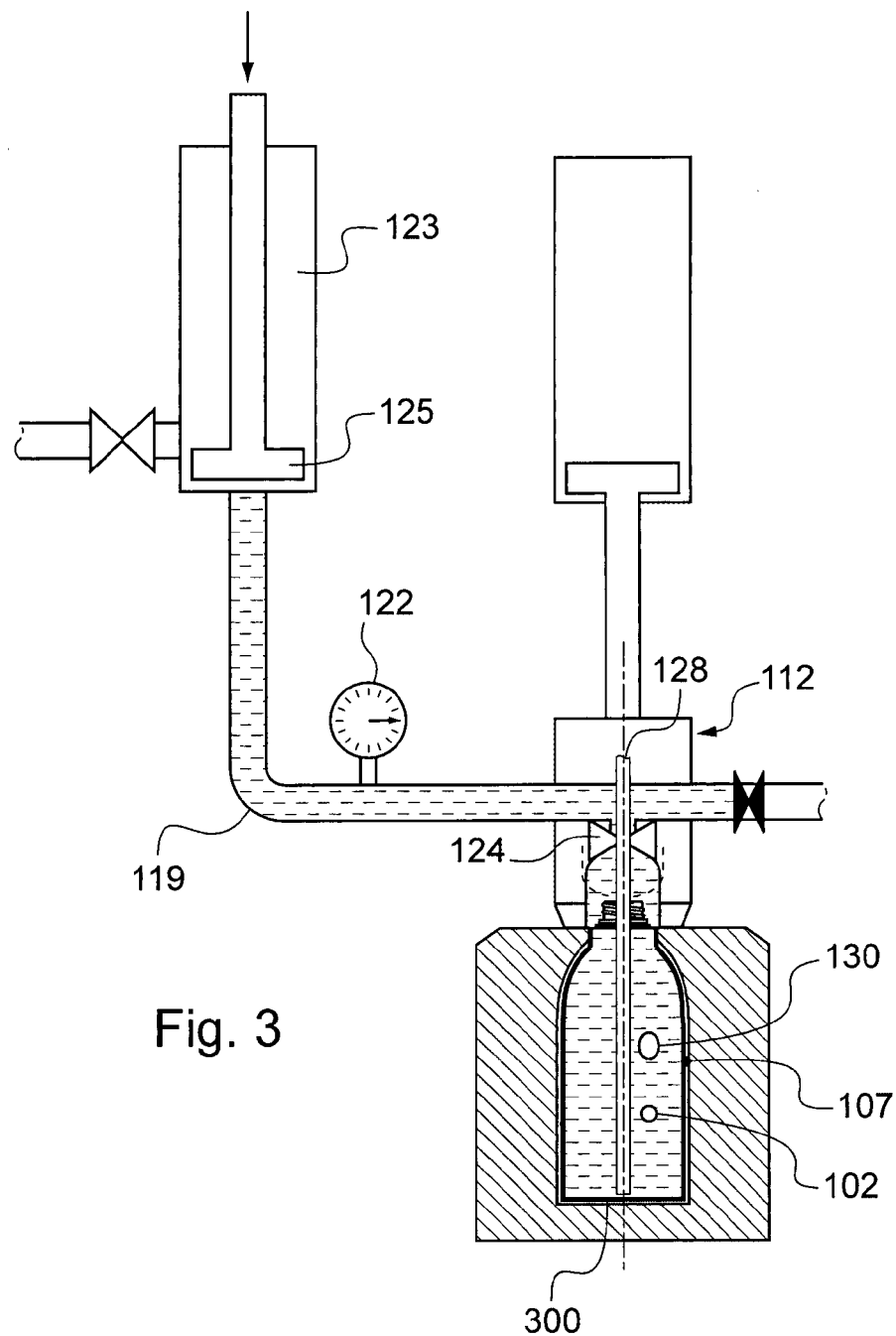
FIG. 3 depicts the apparatus upon completion of the second step for injecting.

FIG. 3 depicts the apparatus upon completion of the second step for injecting. The injection piston 125 has been fully advanced within the injection cylinder 123, and the volume of liquid 130 previously drawn into the injection cylinder 123 has been transferred to the cavity 102 of the preform.

The preform has fully deformed into the shape of the mold cavity 107, assuming the form of a container 300. The pressure within the container 300, injection pipe 119, and injection cylinder 123 is still elevated, and must be reduced in a subsequent reducing step.

Figure 4:
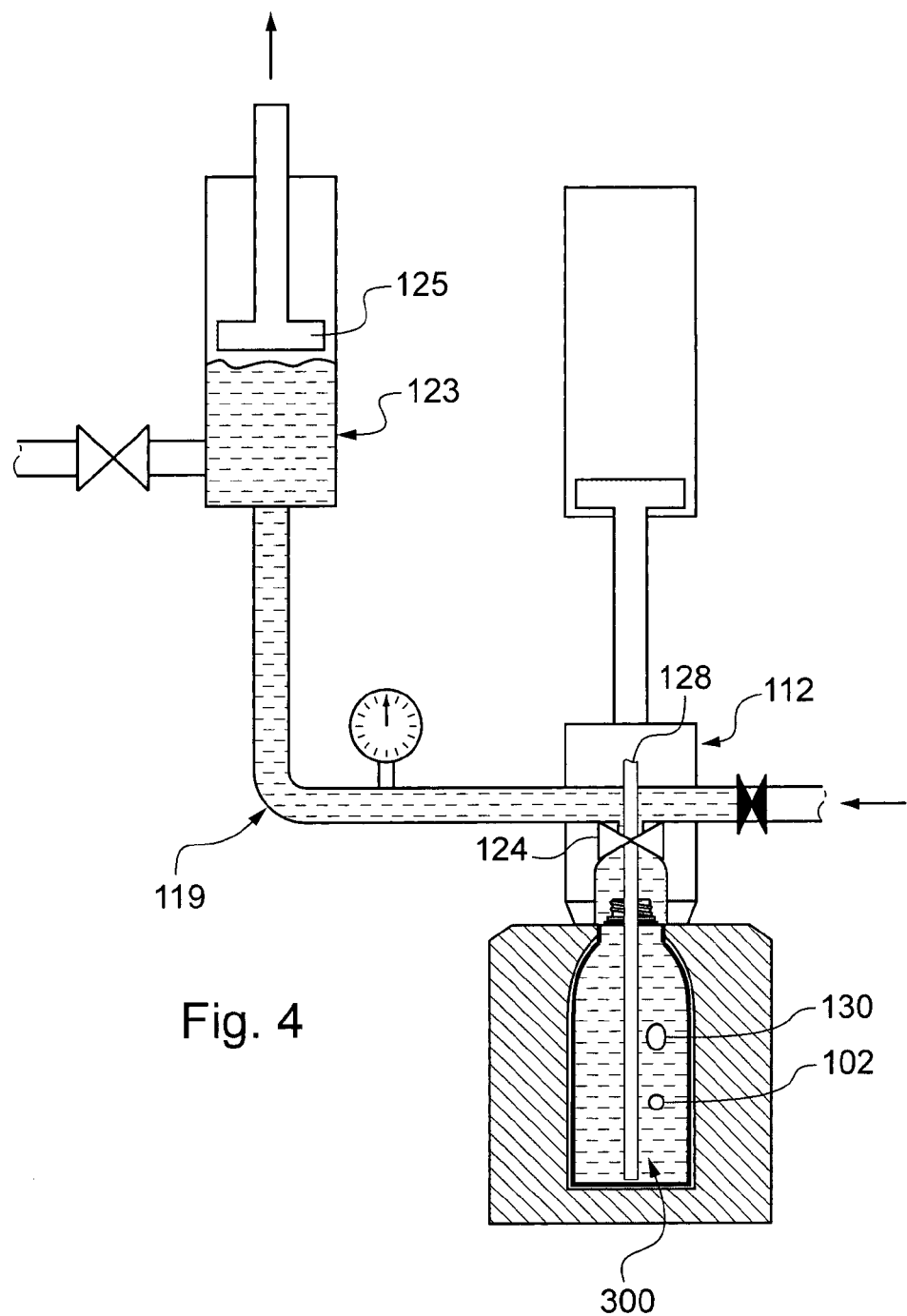
FIG. 4 depicts the apparatus during a third step for reducing pressure.

FIG. 4 depicts a third step for reducing, in which the pressure within the container 300 is reduced to atmospheric pressure. As the injection piston 125 is withdrawn, the pressure within the injection cylinder 123 and injection pipe 119 is reduced. Since the injection cylinder 123 is maintained in sealed fluid communication with the cavity 102 of the container 300, the pressure within the container 300 will be reduced as well.

Preferably, the injection piston 125 is only withdrawn until the pressure within the container 300 is reduced to atmospheric pressure, at which point the injection piston 125 is halted to avoid sucking any of the liquid 130 from the container 300. Preferably, the pressure sensor 122 and injection piston 125 are linked through control circuitry or similar means, so as to simplify the operation of the apparatus.

Preferably, the pressure within the container 300 is reduced to atmospheric pressure within between 0.1 and 2 seconds.

Figure 5:
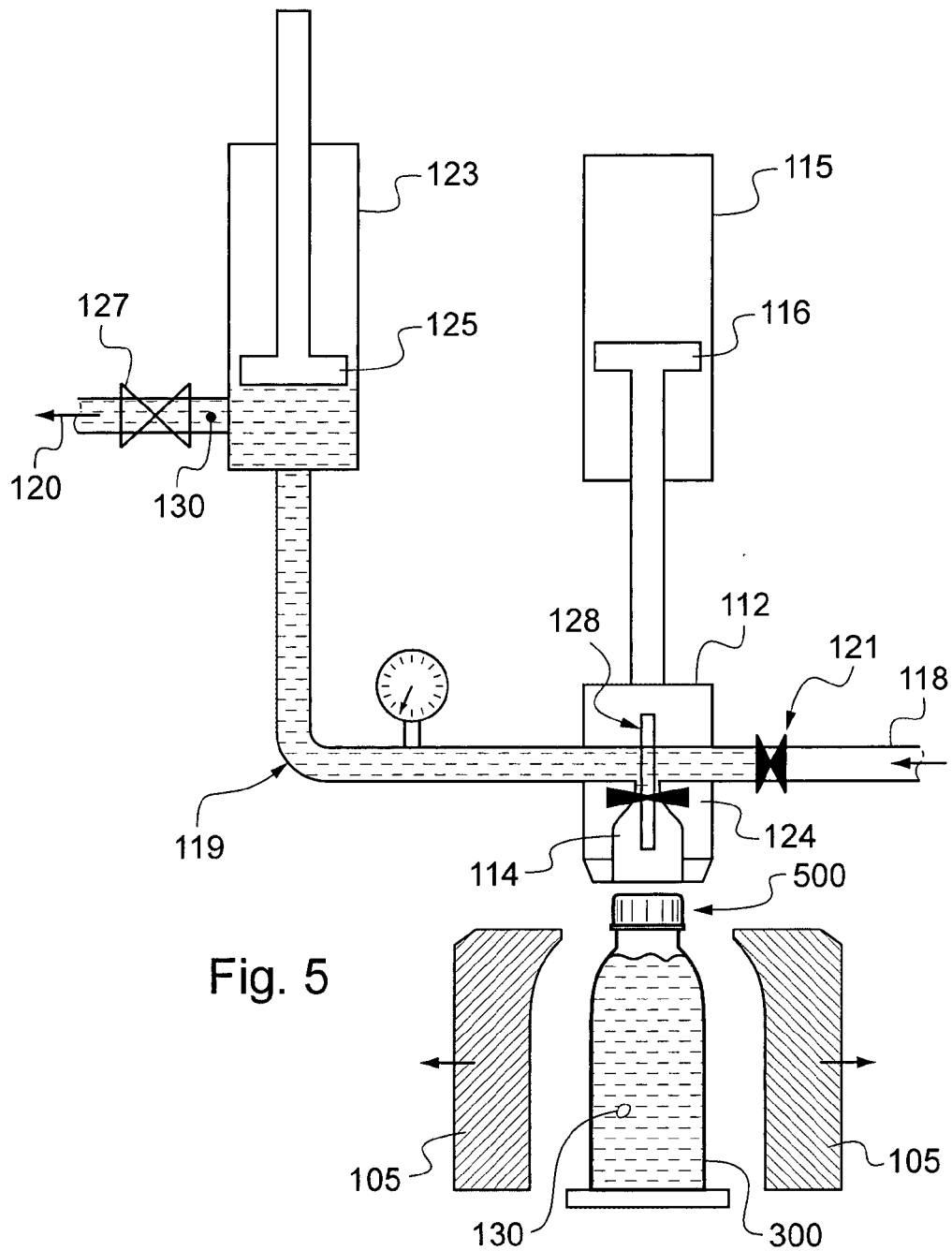
FIG. 5 depicts the apparatus upon completion of the third step for reducing pressure.

FIG. 5 depicts the apparatus upon completion of the third step for reducing. The stretch rod 128 is withdrawn from the container 300 and retracted into the nozzle 112. The feed valve 121 and nozzle valve 124 are closed so as to prevent flow through the feed pipe 118 and nozzle chamber 114, while the return valve 127 is opened. The injection piston 125 is advanced fully to expel any un-injected liquid 130 through the return pipe and back to the liquid supply 120.

The mold halves 104 and 105 are withdrawn from the container 300, and the nozzle piston 116 is retracted into the nozzle cylinder 115, disengaging the nozzle 112 from the container 300 and permitting it to be removed. In a preferred embodiment the nozzle cylinder and piston 115 and 116 are pneumatic devices; however it should be understood that other means for advancing and retracting the nozzle 112 such as hydraulic cylinders, mechanical linkages, or electromagnetic actuators may alternately be employed.

The container 300 is preferably closed in a subsequent closure step, such as with a cap 500 as depicted here. The container 300 may then be removed and a new preform inserted to repeat the process in a subsequent cycle.

Of course, the invention is not limited to the embodiments described above and in the accompanying drawings. Modifications remain possible, particularly as to the construction of the various elements or by substitution of technical equivalents, without thereby departing from the scope of protection of the invention.

In particular, it may be advantageous to perform certain steps of the method simultaneously. For example, one might perform the portion of the positioning step wherein the injection cylinder is filled with liquid at the same time that the container produced in a previous cycle is being removed from the apparatus and closed. In this way the overall time to perform a single fabrication cycle according to the method of the invention is minimized.

Also, the configuration of the mold, nozzle, pipes, and other components may be adapted for any particular size, type, composition, or configuration of container. The parameters of the process, including but not limited to injection pressure and process duration, may also be adapted for optimal performance of the process. Moreover, one may also incorporate other techniques known in the art of container fabrication, such as preform heating or the use of a stretch rod to induce longitudinal deformation, in order to achieve a wider range of container forms than by liquid injection alone.

Furthermore, while in the described embodiment the liquid used is mineral water, it should be understood that a variety of liquids may be used. The process may equally employ liquids which are alimentary (e.g. water, carbonated beverages, or milk products) or otherwise (e.g. pharmaceuticals, cosmetics, soaps, or household chemicals), provided the liquid is not degraded or otherwise rendered unsuitable by the process of the invention.

Finally, it should be understood that though it may be advantageous to seal the container with the injected liquid therein, in some embodiments it may in fact be advantageous to empty the injected liquids from the containers and fill them in a later step.

The exact configuration and operation of the invention as practiced may thus vary from the foregoing description without departing from the inventive principle described therein. Accordingly, the scope of this disclosure is intended to be exemplary rather than limiting, and the scope of this invention is defined by any claims that stem at least in part from it.

The invention claimed is:

1. A method for fabrication of a container, comprising the steps of:
    providing a preform, said preform being substantially tubular and being provided with an open end communicating with a cavity;
    positioning said preform within a mold such that said open end of said preform protrudes from said mold, the shape of said mold substantially defining a container;
    engaging an injector in sealed fluid communication with said open end of said preform and being further configured to inject a quantity of liquid into said cavity of said preform;
    injecting said quantity of liquid into said cavity of said preform, thereby increasing the pressure within said cavity and inducing said preform to deform into the shape of said mold and form a container;
    reducing the pressure within said container to atmospheric pressure while maintaining sealed fluid communication between said injector and said open end; and
    with the pressure within the container at atmospheric pressure, disengaging the injector from the container.

2. The method of claim 1, further characterized in that after the step for positioning the preform the method includes a step for stretching the preform along a longitudinal axis.

3. The method of claim 1, characterized in that during the reducing step the pressure within said container is monitored by a pressure sensor.

4. The method of claim 1, characterized in that during the reducing step, the pressure within the container is reduced to atmospheric pressure in between 0.1 and 2 seconds.

5. The method of claim 1, further characterized in that after the reducing step, the method comprised a closing step for closing the container with the liquid therein.

6. The method of claim 1, characterized in that the pressure generated within said cavity during the injecting step is between 15 and 50 bars.

7. The method of claim 6, characterized in that the pressure generated within said cavity during the injecting step is between 30 and 40 bars.

8. A container produced by the method of any of claim 1.

9. An apparatus for fabrication of a container comprising:
    a mold, the shape of said mold substantially defining a container and further configured to accept a substantially tubular preform being provided with an open end communicating with a cavity, said open end of said preform protruding from said mold; and
    an injector, said injector being disposed in sealed fluid communication with said open end of said preform, where said injector is configured to inject a quantity of liquid into said cavity of said preform, thereby increasing the pressure within said cavity and inducing said preform to deform into the shape of said mold and form a container, and further configured to subsequently reduce the pressure within said container to atmospheric pressure while maintaining sealed fluid communication between said injector and said open end and to disengage the container while the pressure within the container is at atmospheric pressure.

10. The apparatus of claim 9, further characterized in that it comprises a stretch member, said stretching member being configured to stretch the preform along a longitudinal axis.

11. The apparatus of claim 9, characterized in that said injector comprises a piston disposed within a cylinder, said cylinder being in fluid communication with said cavity of said preform.

12. The apparatus of claim 9, where said injector further comprises a nozzle provided with a valve, said valve being configured so as to selectively block or permit fluid communication with said cavity of said preform.

* * * * *